United States Patent [19]
Athenes et al.

[11] Patent Number: 5,083,291
[45] Date of Patent: Jan. 21, 1992

[54] TRANSCEIVING PROCESS FOR A DIGITAL TELEPHONE LINE

[75] Inventors: Claude Athenes, Paris; Jean-Louis Bernet, LaBuisse; Jean-Bernard Saxod, Grenoble, all of France

[73] Assignee: SGS-Thomson Microelectronics S.A., Gentilly, France

[21] Appl. No.: 351,224

[22] Filed: May 15, 1989

[30] Foreign Application Priority Data

May 16, 1988 [FR] France ............................ 88 06896

[51] Int. Cl.$^5$ ............................................ G06F 13/38
[52] U.S. Cl. .............................. 395/325; 364/939.4; 364/933.3; 364/DIG. 2
[58] Field of Search ... 364/200 MS File, 900 MS File

[56] References Cited
U.S. PATENT DOCUMENTS 4,058,682 11/1977 Donne et al. .
4,368,531 1/1983 Chopping .

FOREIGN PATENT DOCUMENTS

56-12149 4/1981 Japan .

*Primary Examiner*—Thomas M. Heckler
*Attorney, Agent, or Firm*—Lowe, Price, LeBlanc and Becker

[57] ABSTRACT

A process for converting a first flow of data words supplied at the rate of a first clock into a second flow of data words comprising, inside the successive frames, a sequence of n data words of the first flow and accompanying data, the duration of each frame of the second flow being equal to the duration of n data words in the first flow. Said process comprises: storing the successive data words of the first flow in an input register (1); as soon as the register is full, writing its content in one of p intermediate registers (A, B, C); sequentially reading the p intermediate registers in an output register (5); and if, during a frame, the writing and reading sequence in the intermediate registers is such that an intermediate register is read while its writing has not been modified, skipping, at the beginning of the following frame, one reading order until one obtains an adequate synchronization which will then be maintained during the subsequent frames.

5 Claims, 6 Drawing Sheets

TRANSCEIVING PROCESS FOR A DIGITAL TELEPHONE LINE

BACKGROUND OF THE INVENTION

The present invention relates to a process for emitting and receiving binary data and to a circuit or interface for implementing this process.

More particularly, the present invention relates to the field of digital telephone and to an interface circuit permitting, from a flow of input data words regularly arriving according to a clock rate, to transmit frame grouped data, each frame comprising n data words from the first flow and accompanying words useful for synchronizing and identifying the frames. The system has to operate in such a way that the transmission of n data words in the second flow with the additional accompanying words has the same duration as the reception of n data words from the first incident flow.

The invention also aims at providing for a circuit symmetrical to the above-mentioned circuit, that is, an interface receiving frames and sending back a continuous flow of data words without the accompanying words.

One object of the present invention is to provide for such a process which is particularly simple to implement, realizable in the form of an integrated circuit, and which avoids any loss of information once the synchronization initial operations in the interface have been carried out.

In order to achieve this object and others, the present invention provides for a process to convert a first flow of data words supplied according to a first clock rate into a second flow of data comprising, inside successive frames, a sequence of n data words of the first flow and accompanying data, the duration of each frame of the second flow being equal to the duration of n data words in the first flow, this process comprising the following steps:

storing the successive data words of the first flow in an input register, as soon as the register is full, writing its contents in one of p intermediate registers, sequentially reading the p intermediate registers into an output register, and skipping, at the start of the following frame, one read operation until a suitable synchronization, which will then be maintained during the subsequent frames, is obtained.

BRIEF DESCRIPTION OF THE DRAWINGS

The foregoing and other objects, features, advantages of the invention will be apparent from the following detailed description of preferred embodiments as illustrated in the accompanying drawings wherein.

DETAILED DESCRIPTION OF THE INVENTION

Figure 1:
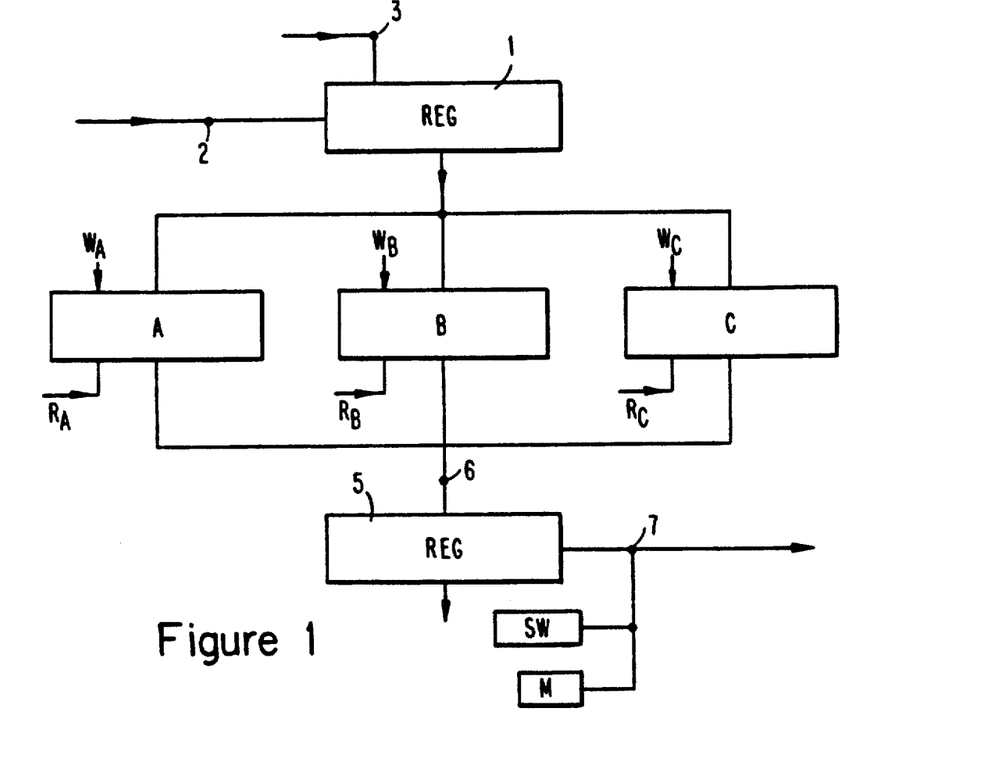
FIG. 1 shows the arrangement of intermediate registers used in the interface circuit according to the present invention in the transmission direction.

FIG. 1 shows the general arrangement of a circuit according to the invention. A buffer register 1 receives data from an incident word flow, those words arriving in synchronization with a clock having a determined period, available on a terminal 3 of the register.

Considering the flow of incident words, it is desired to transfer the words into an output register 5 comprising a parallel input 6 and a series output 7 for subsequently transmitting a frame comprising a sequence of a given number of data words and of accompanying words referenced SW and M. A full output frame, comprising n data words and two accompanying words (SW and M) has the same duration as n words in the incident data flow on terminal 2 of the input register 1. Thus, the transmission frame clock has a period which is an integral multiple (n) of the reception frame clock.

However, it is also assumed that the input and output clocks are asynchronous, that is, they are not phase-related and are affected by a jitter, i.e. shifts may occur from one period to another but those shifts are periodical and, as a whole, null.

According to the invention, the words of register 1 are sequentially sent into intermediate registers A, B, C according to the write pulse (WA, WB, WC) rate and are read in register 5 at the rate of the read pulses RA, RB, RC.

In addition to this general architecture, the invention relates more particularly to the synchronization mode between the write/read pulses, to especially permit use of a minimum number of intermediate registers.

In the following, it will be assumed that the clock available on terminal 3 has a 125-microsecond period (8 KHz frequency), and that the data words are 18-bit words, that is, that 18 bits are introduced into register once every 125 microseconds. The bits constituting the 18-bit words are introduced into the input register at the rate of a bit clock timing without specific characteristics, that is, inside one word period, 18 clock pulses coincide with the 18-bit words at any time inside this period. Thus, this bit clock cannot be used in the synchronization device except for shifting the bits into the input register.

It will also be assumed that the output frame clock has a period of 1.5 milliseconds, that is, the clocks for the input words and the output frames are in a 1 to 12 ratio. Thus, an output frame will include 12 successive data words and the adequate accompanying words SW and M.

Figure 2:
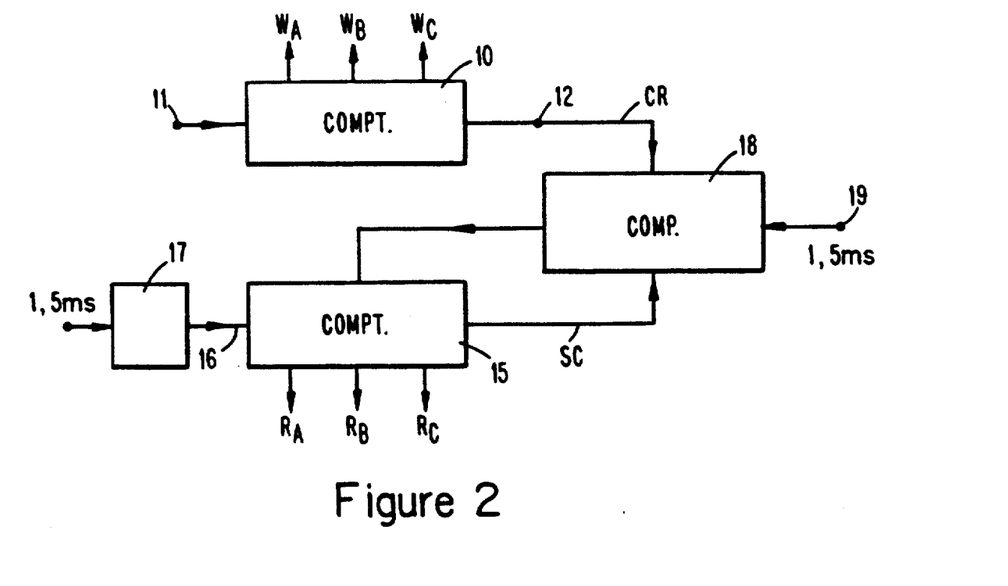
FIG. 2 very schematically shows, in block diagrams, a synchronization circuit for read/write signals according to the invention, in the transmission direction.

FIG. 2 shows a very schematic block diagram of the synchronization circuit according to the invention, which is designed to supply the write signals WA, WB, WC and the read signals RA, RB and RC of the three above-mentioned registers A, B, C.

A reception counter 10 receives the above-mentioned clock signals according to the synchronization frequency of the reception words, that is, at a period of 125 microseconds, on its input 11 and supplies the output signals WA, WB, WC with a time interval of 125 microseconds towards each of registers A, B, C. This counter further supplies on an output 12 a signal CR in coincidence with the writing signal WA. This coincidence between CR and WA is arbitrarily chosen (a signal in coincidence with WB or WC could have been chosen). In other words, the reading and the writing of a same register are compared and not the reading and the writing of the register corresponding to the first 18-bit word transmitted at the starting of a frame. A transmission counter 15 receives on its clock input 16 signals from a dividing circuit 17 receiving the transmission frame synchronization signal having a period of 1.5 milliseconds so that one obtains on output 16 signals at the rate of the interval between the successive read signals RA, RB, RC to be sent to the various registers, as hereinafter described in more detail. The output of the transmission counter 15 supplies signals SC associated with each signal RA. Signals CR and SC are respectively associated with signals WA and RA, as hereinafter described, so that, when the write/read synchronization is adequate, they are not simultaneously at a high level. The relative state of signals CR and SC is detected by a phase comparator 18 which also receives on input 19 the transmission frame synchronization signal of 1.5 milliseconds and which controls the transmission counter 15 in order to shift by one pulse (that is, skip one time) the reading of a register RA, RB or RC when the phase comparator 18 indicates that signals CR and SC are no longer in the desired relative state, that is, when RC.SC=1.

Before describing in more detail a preferred implementation of the circuit of FIG. 2, the aimed synchronization will be explained in a descriptive way in connection with FIG. 3. In order to make this problem better understood, exemplary numerical values will be given in addition to the already mentioned numerical values. One will consider the case in which the whole set of accompanying words M and SW corresponds to 24 bits and the case, as hereinabove mentioned, in which each of the data words corresponds to 18 bits. Thus, in the transmission frame, each data word will correspond to a duration of 112.5 microseconds.

Considering the starting of the first pulse of the transmission frame synchronization, or window, having a duration 112.5×12=1,350 microseconds, at the initial time of this pulse, counter 15 sends a read signal, for example signal RB. Then, at a time non-synchronized with respect to the transmission of signal RB, one of the three write signals WA, WB, WC arrives, for example WB in the case shown. It will be apparent that this arrival of a signal WB after a signal RB is not suitable for an adequate synchronization. 112.5 microseconds after pulse RB, pulse RC arrives and 125 microseconds after pulse WB, pulse WC arrives; then, likewise pulse RA then pulse WA arrive. Comparator 18, which had indicated that a satisfactory synchronization condition had not been obtained, sends a skip signal (SKIP) to transmission counter 15 to cause it to skip one read step, that is, the read pulse is sent back a second time, i.e., a register A, B or C is read again. Then, periodically, successive pulses RB, RC, RA . . . are sent again until the words M and SW are sent before transmitting the next frame. Said next frame starts with a read signal RA and, since a wrong synchronization again occurs, a read pulse is once more skipped. Then, during the successive cycles, the same order, starting with the transmission of a signal RC then signal RA, is repeated at each successive frame.

It will be noted that 0, 1 or 2 read times are skipped, that is, synchronization is achieved in 0, 1.5 or 3 milliseconds. The maximum convergence time is therefore 3 milliseconds.

In the above description, it has been pointed out that, a priori, a sequence starting with a signal RB or signal RA was not suitable. It can be seen that the sequence starting with a signal RB is unsuitable by looking at the references indicated around the circle illustrated in FIG. 3. The times at which the read pulses (RA, RB or RC) are emitted are labelled (1) to (12). Starting at position (4), a read signal RA arrives soon after a write signal WA: there is no problem. Likewise, positions (5), (6), (7) and at the most (8) are satisfactory. On the contrary, it is clear, at position (9), that a read signal RC is emitted before the write signal WC has been applied, that is, at position (9) the same word as the one that had been read at position (6) will be read a second time.

Figure 3:
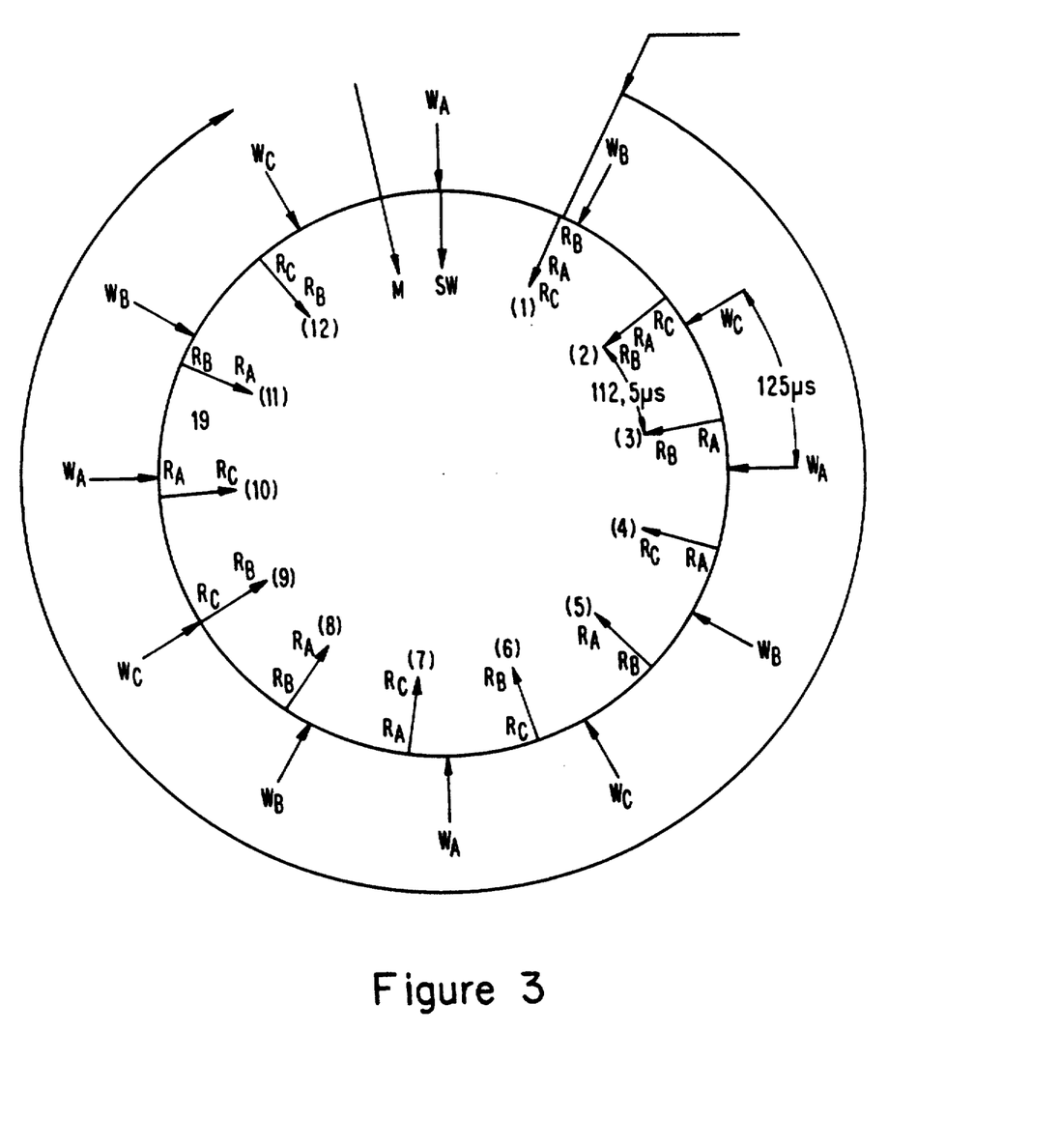
FIG. 3 aims to explain the synchronization process that the present invention implements in the transmission direction.

But, considering the read signals successively transmitted and indicated near the arrow inside the circle illustrated in FIG. 3, starting with signal RC, it is clear that a read signal always follows a write signal. Indeed, the calculation is carried out so that the read signal at the twelfth position (RB) follows a write signal (WB). On the other hand, the margin has to be large enough to take the various possible error sources into account and especially the jitter existing between the reception clock and the window signal (and the resulting signals at a period of 112.5 microseconds).

It will be noted that it is from considerations such as those illustrated in FIG. 3 that one will determine the minimum number of required registers as a function of the relative read/write periods, of the number of words in a transmission frame and of the duration of the accompanying signals within this transmission frame. In connection with the hereinabove given numerical example, three registers are sufficient, that is, it would not be possible to use fewer registers. One could use a higher number of registers but this would only contribute to complicate the system and it is advisable to prefer the lowest possible number.

Figure 4:
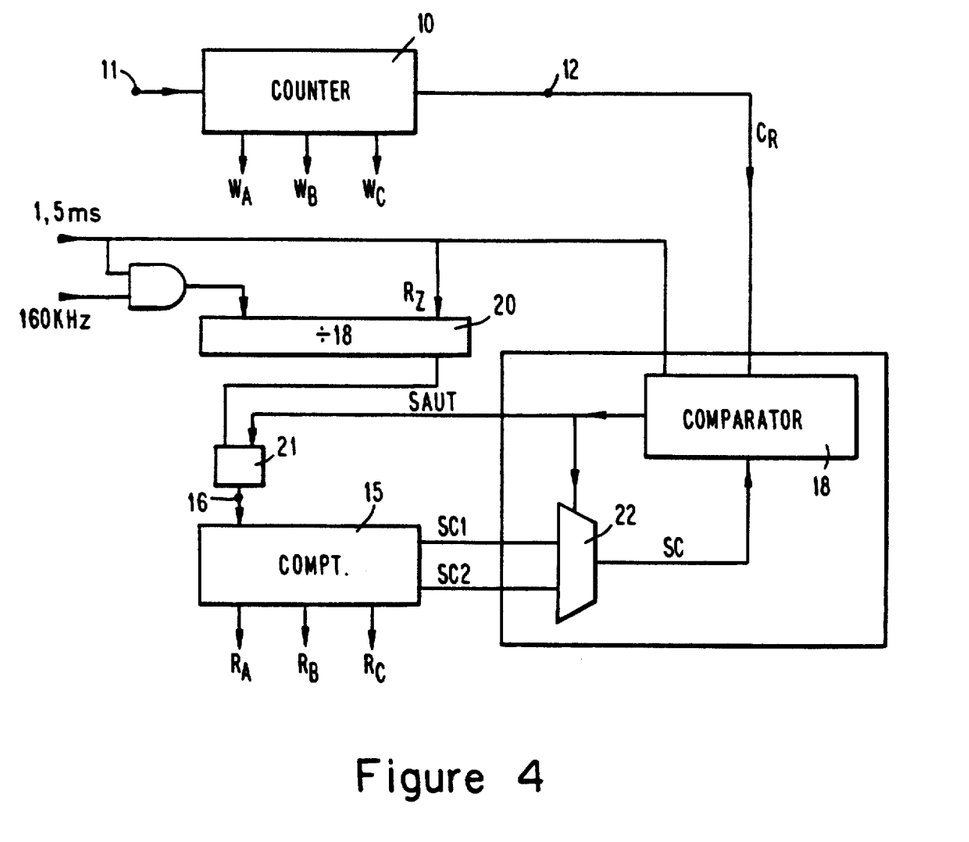
FIG. 4 shows in more detail the synchronization circuit used according to the present invention.

FIG. 4 describes in more detail an exemplary implementation of circuit of FIG. 2. This figure again shows the reception counter 10 supplying the signals WA, WB and WC, receiving the synchronization signal on its terminal 11 and supplying a signal CR on its terminal 12 towards comparator 18. This figure also shows again counter 15 receiving the clock signals on an input terminal 16 and supplying an output signal SC towards comparator 18.

More precisely, the window signal having a 1.5 ms period is sent to an enable input of comparator 18 and to a reset input of a counter-divider by 18, 20, which receives a 160 KHz signal for the duration of the window. The output of this divider by 18 is a 112.5-microsecond signal which is applied to the input 16 of counter 15 through a gate 21, the second input of which receives the output of comparator 18 for inhibiting this gate 21 when comparator 18 has determined that the phase relationship between signals CR and SC is not satisfactory.

According to a preferred embodiment of the invention which will be described hereinafter, counter 15 does not supply a single signal SC in relation with signal RA but two signals SC1 and SC2, both in relation with signal RA and which are selected by a gate 22 as a function of the comparator output (signal SC1 is sent as long as skip signals are present and signal SC2 is sent as soon as there are no more skip signals, and the opposite selection occurs again if skip signals appear again). SC1 and SC2 are generated from decoding of counter 20 which permits choice of a position among 18 and from counter 15 which determines the read time RA.

Figure 5:
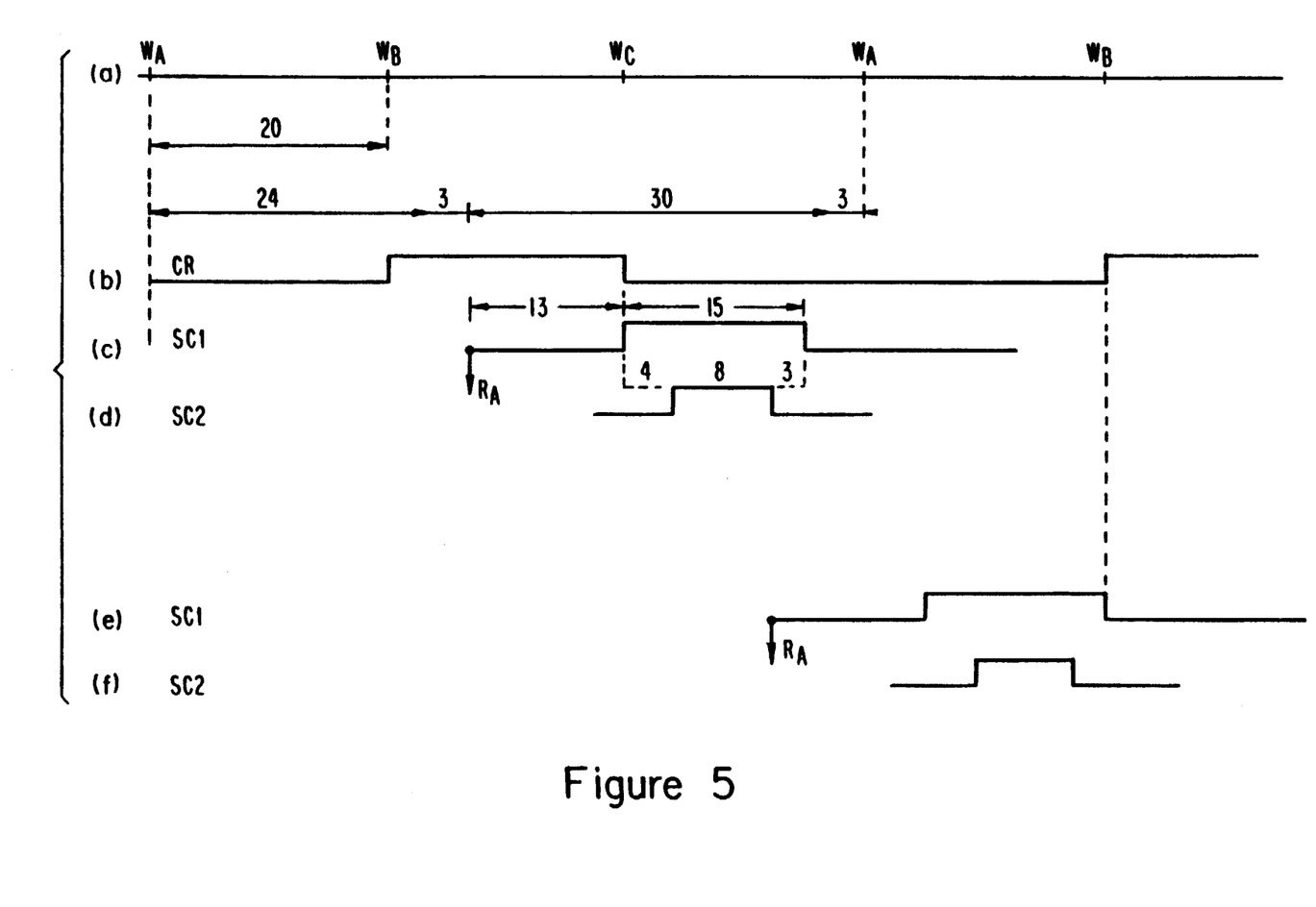
FIGS. 5 and 6 show the timing diagrams designed to illustrate the signals supplied by the synchronization circuit according to the present invention.

The synchronization conditions for supplying signals RA, RB, RC with respect to signals WA, WB, WC and more particularly signals RA and WA can be analyzed in more detail in relation with the timing charts of FIG. 5.

In FIG. 5, curve (a) indicates three arrival times of the write pulses WA, WB and WC. With the above numerical values, when counting the number of transmission frame bits, the interval between the successive write pulses is 20 bits. Thus, the first signal RA has to arrive with respect to signal WA with a minimum delay of a duration of 24 bits (duration of the accompanying word M+SW)+the duration of 3 bits corresponding to the maximum jitter amplitude. On the other hand, signal RA has to arrive three bit durations before the following signal WA in order to take the jitter into account. Thus, an authorized area for the first signal RA is obtained with respect to the first signal WA located in a window having a 30-bits duration.

It would be possible, for each incident read signal RA, RB or RC, to provide for logic circuits making comparisons and introducing delay times to ascertain that the adequate relationship is obtained with respect to the first write signal WA, WB or WC.

According to one embodiment of the present invention, it is preferred to arbitrarily compare the write time WA with the read time RA as illustrated in FIG. 5(b). For this purpose, one produces from the signal of counter 10 an input CR on a terminal 12 at a high level during the interval WB-WC and at low level during the remaining time duration then, from a transmission counter 15, one produces a signal SC, for example a signal SC1 exhibiting a determined shift with respect to signal RA for simplifying comparison between signal SC1 and signal CR. This signal SC1 is liable to be for example a signal, illustrated in (c) and (e), having a time delay with respect to signal RA of a 13-bits duration then remaining at a high level for a 15-bits duration. Thus, a comparison between signals CR and SC1 permits one to ascertain that the proper condition was validated from the moment when the product CR by SC1 is equal to 0 (in FIG. 5(c), signal SC1 is shown at its leftmost position while RA is at its left limit position ; in FIG. 5(e), signal SC1 is shown at its rightmost position while RA is at its right limit position).

A further characteristic of the present invention, once signal RA is synchronized with respect to signal WA, that is, once the intersection of SC1 and CR has been determined as being null, is that, instead of SC1 a signal SC2 is produced exhibiting a higher time delay with respect to signal RA for increasing the authorized shift range between WA and RA, that is, for taking the jitter into account once the synchronization is achieved, this jitter being liable to change sign with respect to the value it had at the synchronization time and being liable to have the maximum authorized amplitude. This signal SC2 is shown by way of example in FIGS. 5 (d) and (f).

Figure 6:
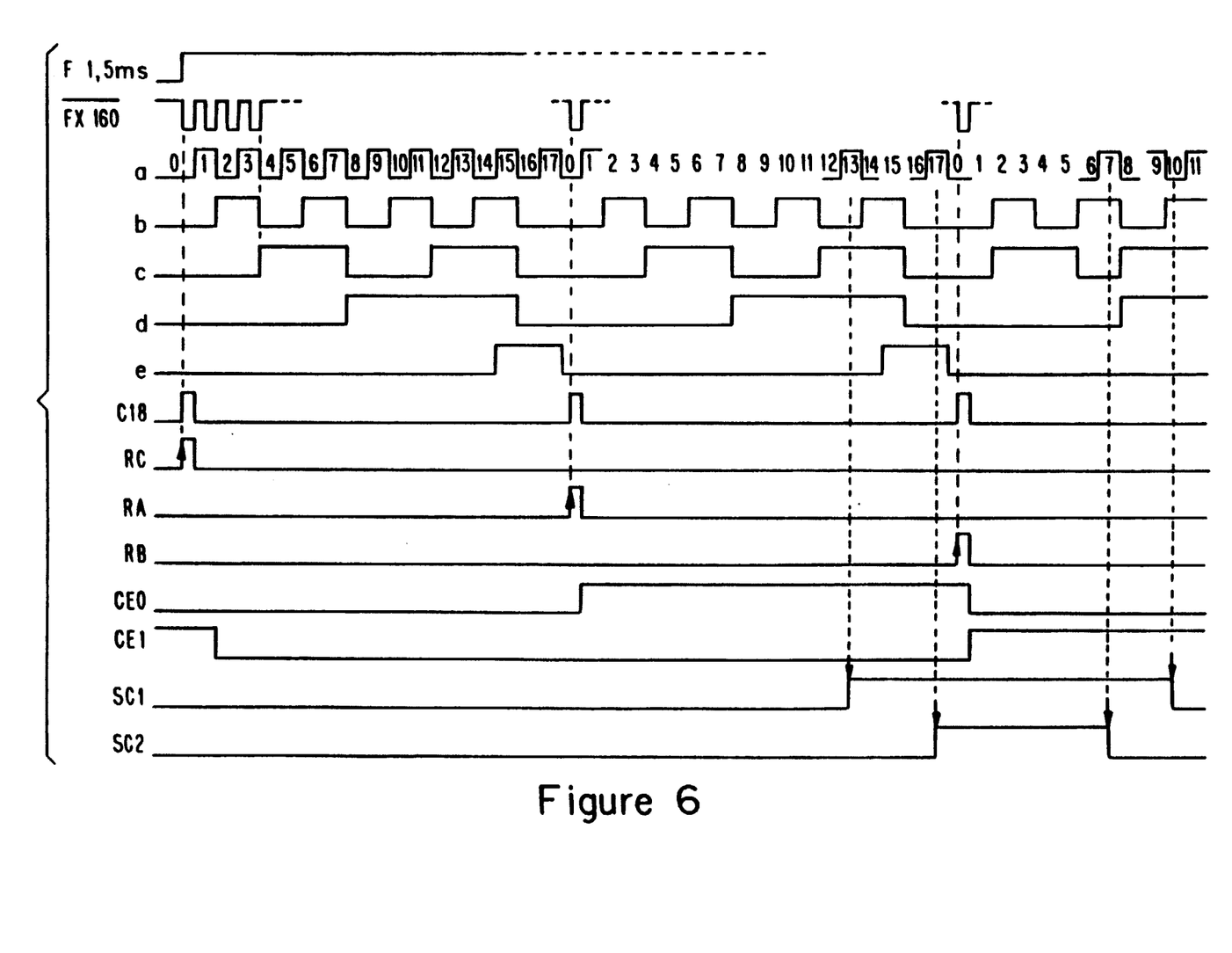

FIG. 6 is a more accurate timing diagram showing the outputs of counter 20 of FIG. 4 in a preferred embodiment, the global output of the counter being referenced C18.

Figures 7, 8, 8A:
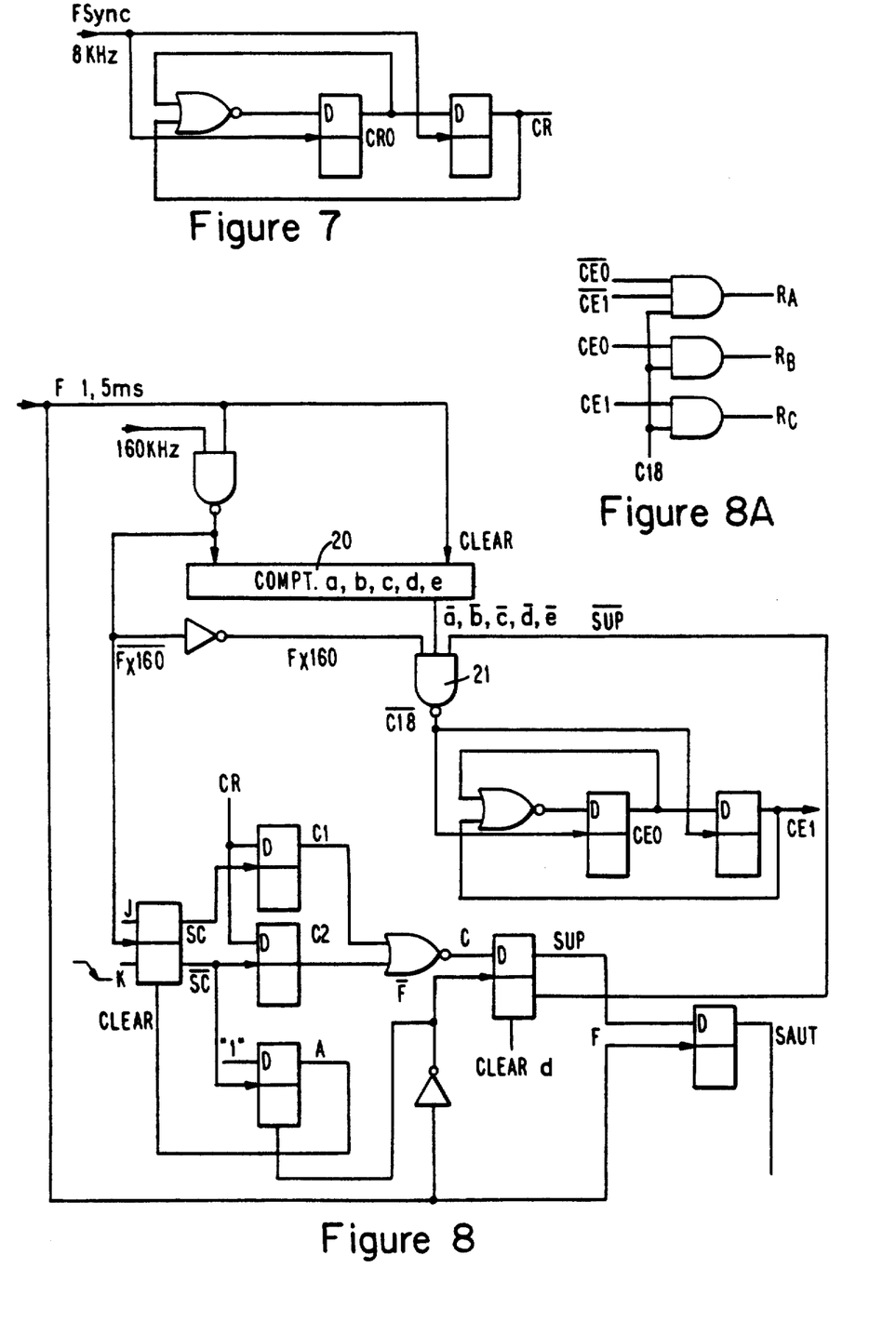
FIGS. 7, 8 and 8A show in more detail circuits designed to supply the comparison signals in the comparator illustrated in FIGS. 2 and 4.

FIGS. 7 and, 8 and 8A show preferred embodiments of the logic circuits of the reception and transmission counters to meet the requirements of the various functions hereinabove mentioned.

In FIG. 7, the reception counter 10 is realized by means of an NAND gate and two D-type flip-flops permitting to supply the signal CR as well as the reverse signal.

FIGS. 8 and 8A show a detailed embodiment of components of FIG. 4 except for counter 10 which is illustrated in FIG. 7. This figure again shows counter 20 and the various signals illustrated in FIG. 6 labelled with the same references. A particular attention is to be paid to the output "SKIP" of comparator 18 used in the way indicated in FIG. 4 for validating gate 21 (in order to suppress a pulse C18 in order to be set in the synchronization mode) and to permit to switch from signal SC1 to signal SC2 once synchronization is achieved.

One advantage of the synchronization circuit according to the invention is that, while it has been hitherto described as a means for converting a first flow of data words supplied according to the timing of a first clock into a second data flow comprising, inside the successive frames, a sequence of n data words from the first flow and accompanying data, the duration of each frame of the second flow being equal to the duration of n data words in the first flow, it is liable to be used reciprocally with a few minor modifications. In other words, this circuit which has been hitherto described in the "transmission" mode will also be liable to be used in the "reception" mode. Very schematically, the modifications to be brought will consist, referring to the block diagram of FIG. 2, in using the output of comparator 18 for controlling counter 10 and no longer counter 15. Therefore, it is now the reception counter and no longer the transmission counter that is synchronized.

We claim:

1. A process for converting a first flow of data words supplied at the rate of a first clock into a second flow of data words comprising, inside successive frames, a sequence of n data words from the first flow, the duration of each frame of the second flow being equal to the duration of the n data words in the first flow, said process comprising the steps of:
   storing the successive data words of said first flow in an input register;
   writing the contents of said input register into one of a plurality of intermediate registers when said input register is fully loaded with said data words,
   sequentially reading said intermediate registers into an output register; and
   skipping a reading of any of said intermediate registers if the contents thereof have been modified during a specified time period.

2. A process according to claim 1, wherein said specified time period is set to a first value during a synchronization phase and to a second value after said synchronization phase has been completed, wherein said second value is larger than said first value.

3. The process of claim 2, wherein said specified time period is determined by comparing a first shift signal associated with the loading times of a full word into said input register and a second shift signal associated with the read times of said output register.

4. The process of claim 3, wherein there are three of said intermediate registers and wherein:
   said first shift signal is associated with the writing time of one of said intermediate registers and is set to a first logic level between the write times of the other two intermediate registers and to a second logic level otherwise; and said second shift signal is set to a first logic level during a time interval having a determined duration and exhibiting a time delay with respect to the read time of said one intermediate register, said duration and said time delay being determined so that said first and second shift signals are not both set to a high level during said synchronization phase.

5. The process of claim 4, wherein said second value is derived from said first value.

* * * * *